United States Patent
Steves et al.

(10) Patent No.: US 10,255,577 B1
(45) Date of Patent: Apr. 9, 2019

(54) SYSTEM AND METHOD FOR GENERATING A DELIVERY PLAN FOR MULTI-TIER DELIVERY SCHEMES

(75) Inventors: Andrea C. Steves, Seattle, WA (US); Sebastian Lehmann, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1428 days.

(21) Appl. No.: 13/335,758

(22) Filed: Dec. 22, 2011

(51) Int. Cl.
- *G05D 1/02* (2006.01)
- *G06Q 10/08* (2012.01)
- *G06Q 30/00* (2012.01)

(52) U.S. Cl.
CPC ......... *G06Q 10/083* (2013.01); *G05D 1/0212* (2013.01)

(58) Field of Classification Search
CPC ...... G06Q 10/083; G06Q 50/28; G06Q 10/08; G06Q 10/08355; G06Q 30/0639; B07C 3/00; B60R 25/33
See application file for complete search history.

(56) References Cited

U.S. PATENT DOCUMENTS

| | | | |
|---|---|---|---|
| 7,177,825 B1 | 2/2007 | Borders et al. | |
| 7,251,612 B1* | 7/2007 | Parker et al. | 705/7.22 |
| 7,587,345 B2 | 9/2009 | Mann et al. | |
| 2006/0167733 A1* | 7/2006 | Scott et al. | 705/8 |
| 2008/0027599 A1* | 1/2008 | Logan | G05D 1/0234 701/23 |
| 2011/0112761 A1* | 5/2011 | Hurley | G01C 21/32 701/465 |

\* cited by examiner

*Primary Examiner* — George Chen
(74) *Attorney, Agent, or Firm* — Robert C. Kowert; Meyertons, Hood, Kivlin, Kowert & Goetzel, P.C.

(57) ABSTRACT

Various embodiments of a system and method for generating a delivery plan for multi-tier delivery schemes are described. Embodiments may include generating a delivery plan for a region including multiple delivery locations. The delivery plan may specify at least one agent delivery route within the region. The delivery route may include at least one shipment acquisition location coinciding with an expected travel route of a vehicle conveying shipments. The agent delivery route may be traversed by an agent that is to deliver a specific group of shipments acquired from the vehicle at the shipment acquisition location. Embodiments may include selecting the specific group of shipments for delivery on the delivery route. The selecting is based on a time constraint for delivering the group of shipments to respective delivery locations along the delivery route, and historical delivery time information for previous deliveries to the delivery locations along the delivery route.

30 Claims, 6 Drawing Sheets

SYSTEM AND METHOD FOR GENERATING A DELIVERY PLAN FOR MULTI-TIER DELIVERY SCHEMES

BACKGROUND

Merchants that operate network-accessible marketplaces may maintain electronic catalogs that include thousands of items (or more) offered for sale. These items may be purchased through an electronic checkout process. For instance, a customer may add one or more items to an electronic shopping cart, as well as provide payment and shipping details. The merchant may ship the items to the customer using a shipping carrier or postal service. Generally, shipments are provided to a customer's address via one or more shipping carrier vehicles. For instance, a delivery truck may travel the streets of an urban area and deliver a shipment containing ordered items to a customer's apartment or condominium. In some regions, parking locations for shipping carrier vehicles may be unavailable or cost-prohibitive. In some cases, shipping carrier vehicles may be left to idle during one or more deliveries. This process may utilize costly fuel and/or contribute excess emissions into the environment, as well as contribute to traffic congestion.

While the system and method for generating a delivery plan for multi-tier delivery schemes is described herein by way of example for several embodiments and illustrative drawings, those skilled in the art will recognize that the system and method for generating a delivery plan for multi-tier delivery schemes is not limited to the embodiments or drawings described. It should be understood, that the drawings and detailed description thereto are not intended to limit the system and method for generating a delivery plan for multi-tier delivery schemes to the particular form disclosed, but on the contrary, the intention is to cover all modifications, equivalents and alternatives falling within the spirit and scope of the system and method for generating a delivery plan for multi-tier delivery schemes as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for generating a delivery plan for multi-tier delivery schemes are described. In some delivery schemes, shipping carriers may be responsible for "last-mile" delivery of shipments, which may generally refer to the last segment or leg of a delivery route for a shipment. For instance, a merchant may send a customer a shipment of ordered items through a shipping carrier. The shipping carrier may pick up the shipment from one of the merchant's facilities, process the shipment through the shipping carrier's shipping network (e.g., a series of hubs), and eventually convey the shipment from the last hub to the end destination (e.g., a delivery address specified by a customer at order time). Generally, this final segment of the delivery route is handled by a shipping carrier employee (e.g., a driver) that navigates a delivery vehicle containing multiple shipments to multiple delivery locations. Upon arriving at or near a shipment destination, the driver may park the vehicle or let the vehicle stand idle while the driver delivers one or more shipments nearby. Generally, this is a serial process meaning the driver stops the vehicle, delivers one or more packages, and travels to the next delivery location. While the driver is off delivering shipments, his vehicle generally sits unused. Embodiments described herein may include a different approach for shipment delivery, as described below with respect to FIG. 1.

Figure 1:
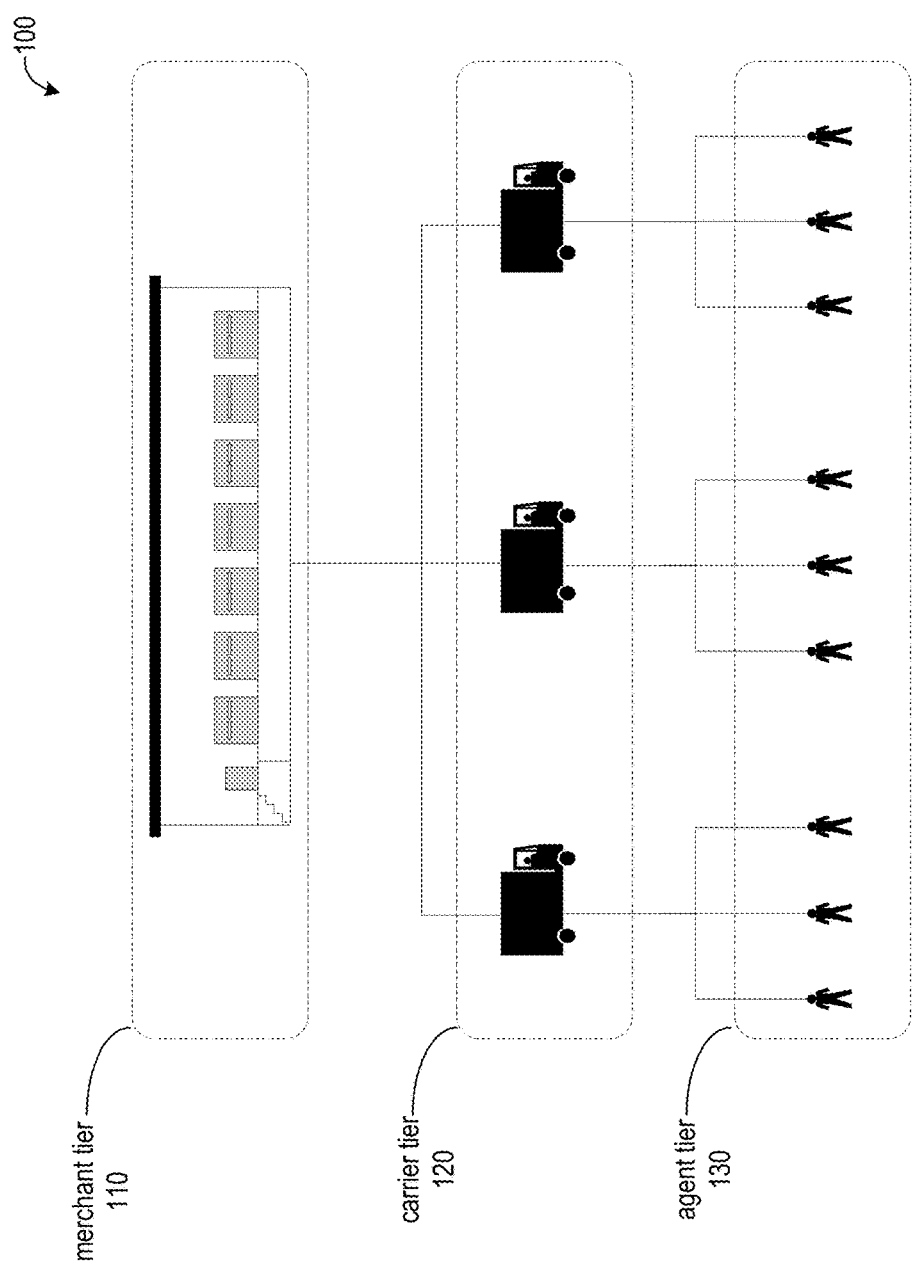
FIG. 1 illustrates a block diagram of an example multi-tier delivery scheme, according to some embodiments.

FIG. 1 illustrates a multi-tier system 100 that includes a merchant tier 110, a shipping carrier tier 120, and a delivery agent tier 130. Note that the contents of each tier are merely examples; the illustrated tiers are not limited to the illustrated elements. Merchant tier 110 may include any element of a merchant's fulfillment network, which may include any number of facilities in order to fulfill customer demand. For example, in response to customer orders, an order management system may issue fulfillment orders to one or more merchant facilities. Merchant facilities may store inventory in the items ordered. To fulfill the customer orders, the one or more items specified in each order may be retrieved, or picked, from inventory (which may also be referred to as stock storage) in the merchant facility. Picked items may be delivered or conveyed, if necessary, to one or more stations in the merchant facility for various outbound shipment processes. Examples of outbound shipment processes may include sorting items into their respective orders, packing the items into shipping containers, and finally shipping to the customers. A picked, packed and shipped order does not necessarily include all of the items ordered by the customer. For example, an outgoing shipment to a customer may include only a subset of the ordered items available to ship at one time from the merchant facility. In other examples, items of the order may be split into multiple shipments for a variety of reasons including but not limited to space and/or economic efficiency. For instance, shipping a set of items in three small shipments may be less expensive than shipping the set of items in one large shipment. A merchant facility may also include a receiving operation for receiving shipments of inbound stock from one or more sources (e.g., vendors) and for placing the received stock into stock storage. When a shipment is ready to be shipped (or expected to be ready), fulfillment management systems in the merchant tier may send a notification to one or more shipping carrier system in the carrier tier 120 in order to notify the carrier that one or more shipments are ready for shipment. In other cases, the shipping carrier need not receive such notification and may automatically visit facilities to pickup shipments (e.g., a daily pickup).

Figure 2:
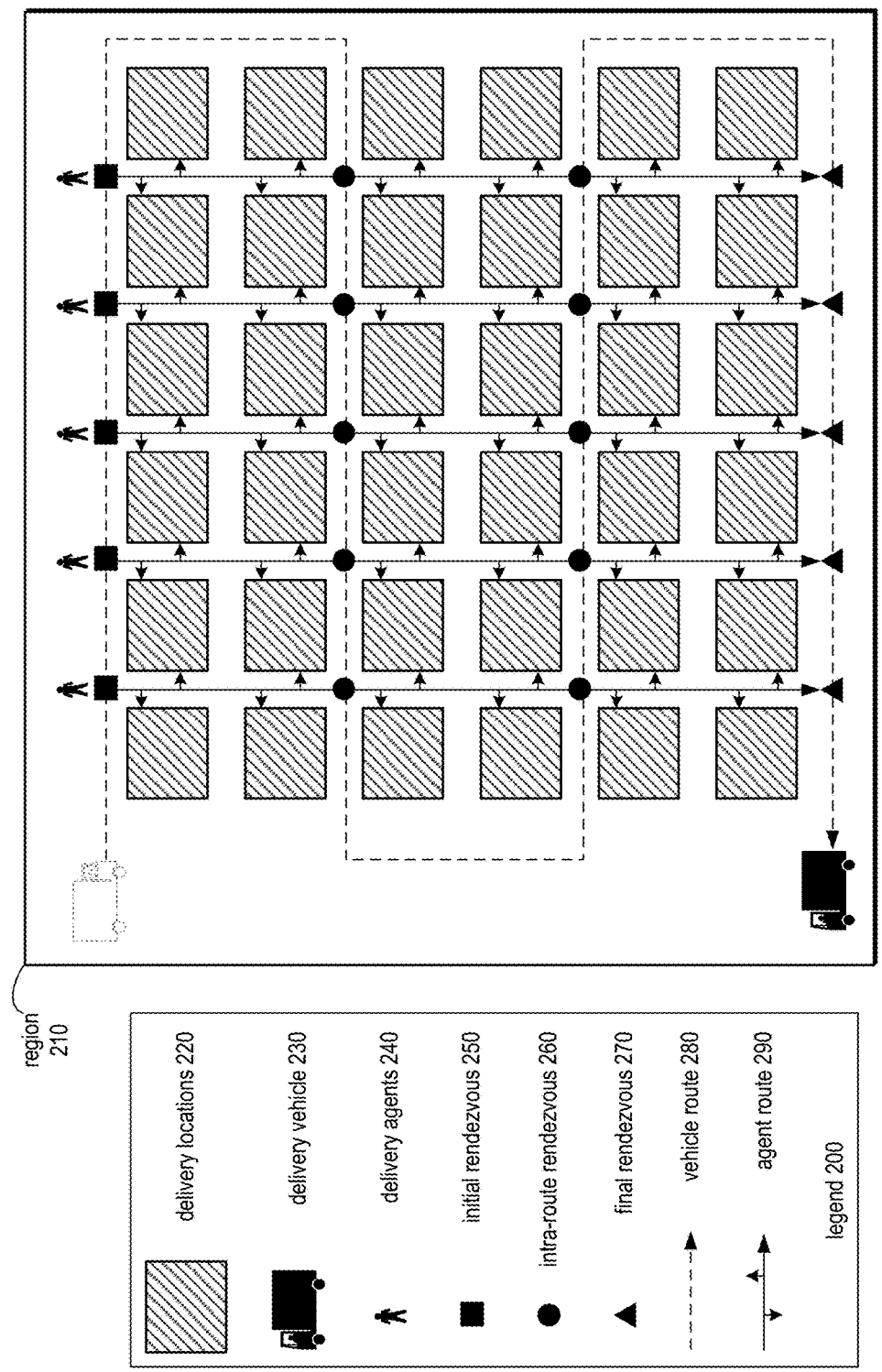
FIG. 2 illustrates a block diagram of an example delivery region utilizing multi-tier delivery, according to some embodiments.

In carrier tier 120, the shipping carrier may pick up the shipment from one of the merchant's facilities in the merchant tier 110, process the shipment through the shipping carrier's shipping network (e.g., a series of hubs), and eventually convey the shipment to a final hub. From this final hub, the shipping carrier may dispatch one or more delivery vehicles to convey the shipments proximate to their respective delivery destinations. In various embodiments, instead of the shipping carrier vehicle driver being responsible for delivery of the shipment in the final segment of the delivery route, embodiments may utilize an agent tier 130 to handle the final segment of the delivery route. In one non-limiting example, shipments may be grouped or batched and provided in a tote or other container to the agent. In one non-limiting example, a tote may contain 10-20 shipments for respective delivery locations. The delivery agent may then deliver the shipments and the delivery driver can navigate the truck to a new location, such as to deliver an item or to provide other shipments to other agents. In this way, embodiments may reduce delivery driver inactivity and/or delivery vehicle inactivity (e.g., periods in which the driver has set the vehicle to idle in order to make a delivery). In various embodiments, the delivery agent tier may be operated or controlled by the merchant (e.g., the merchant may be responsible for "last mile" deliveries). In other cases, the shipping carrier may operate or control the delivery agent tier. Further note that in the illustrated embodiment a three tier system is illustrated. However, it should be understood that various embodiments may be incorporated into an n-tier system having any quantity of tiers. Furthermore, aspects of embodiments may be cascaded across multiple tiers although for clarity of description embodiments are generally not described in this manner herein, although these configurations are possible and contemplate. FIG. 2 described below illustrates a non-limiting example of this process in more detail.

FIG. 2 illustrates an example implementation of shipment delivery utilizing a shipping carrier tier and a delivery agent tier for deliveries within a given region. In the illustrated embodiment, this region is illustrated as region 210. This region may be described herein as a relatively dense urban area. However, it should be understood that region 210 may include any type of region of any size or density in various embodiments. A few non-limiting examples of region 210 may include a city, town, neighborhood, state, or nation. Further note that legend 200 specifies the labels for corresponding elements of region 210 in the illustrated embodiment.

In the illustrated embodiment, there are multiple delivery locations 220. These locations may include but are not limited to residential buildings, office buildings, industrial complexes or other possible delivery locations. In the illustrated embodiment, a delivery vehicle 230 may traverse a vehicle route 280 through region 210. The vehicle may stop at one or more delivery locations such that the vehicle driver may deliver one or more shipments as described above. Furthermore, the delivery vehicle 230 may rendezvous with one or more delivery agents 230 as illustrated by initial rendezvous 250. Generally, this meeting may take place at a predetermined or scheduled time. For instance, in cases where the agents are merchant-directed, the merchant may specify to the agent at which time the agent is to meet the delivery vehicle (as well as where to meet the delivery vehicle). This notification may be sent by the merchant utilizing any communication technique including but not limited to text message, email, or phone call. At each initial rendezvous location 250, the respective agent may acquire one or more shipments to be delivered on their own agent delivery route 290. In one non-limiting example, each agent may acquire a group of shipments that have been specifically selected to occupy the agent's time until a next rendezvous with the delivery vehicle (or possible a different delivery vehicle) at a different location. This selection process is described in more detail below but generally includes using historical delivery times for various delivery locations in order to group shipments in such a way that the delivery agent may deliver the acquired group of shipments to their respective delivery destinations and then meet the delivery vehicle at the next rendezvous location, such as one of intra-route rendezvous locations 260. For example, the aggregate of the historical delivery times associated with destination addresses of shipments may be matched to an estimated traversal time for a respective leg of the delivery route (e.g., the leg between rendezvous points). In this way, each delivery agent 240 may deliver their group of shipments and then meet the delivery vehicle at the next rendezvous location. This process may reduce the quantity of time that delivery vehicles sit idle because the delivery vehicle can quickly drop off a batch of shipment to a delivery agent and then move on to the next delivery agent. In this way, the utilization of each delivery vehicle is greater than it would be absent these techniques.

At each intermediate rendezvous 260, the agent may return a previous container or tote (now empty after deliveries) and exchange it for a new tote of shipments (or alternatively refill the existing tote). The delivery agent may then deliver the shipments and meet the delivery vehicle at the next rendezvous location. These rendezvous instances (e.g., a meeting place and time) may be generated as part of a delivery plan, which is described in more detail below with respect to FIG. 4. The delivery plan may control the coordination of the delivery agents and delivery vehicle to ensure that rendezvous occur at optimal or near-optimal locations and times. In this way, embodiments may ensure that resource waste of the delivery vehicle and/or the delivery agents is minimized or nearly minimized. In some embodiments, a container-less or tote-less operational scheme may be utilized. In such cases, there may be no container or tote to return to the vehicle. For instance, in one example, a group of shipments may be physically joined together in a removable fashion, such as through the use of a fabric hook-and-loop fastener (e.g., Velcro) affixed to shipments. In this way a group of shipments may be conveyed on a delivery route without the need for a tote or container.

When a delivery agent has finished his entire route, the agent may meet the delivery vehicle at a final rendezvous 270. The agent may return equipment (e.g., shipment totes or containers) at this time. In some embodiments, the agent may utilize the delivery vehicle as transportation to some other location. For instance, the delivery vehicle may drop the agent off at public transit station so that the agent may return home.

In various embodiments, delivery agents may utilize carts and/or vehicles (e.g., vehicles distinct from vehicle 230) to delivery the shipments received from delivery vehicle 230. In one embodiment, a wheeled personal transporter may transport the delivery agent and shipments to delivery locations. In some embodiments, the delivery agents may be robotic and/or automated. For instance, a robotic agent equipped with artificial intelligence logic may receive a tote of shipments from the delivery vehicle at rendezvous and delivery such shipments to their respective destinations.

In various embodiments, factors other than historical delivery times may also be taken into consideration in generation of the delivery plan that specifies the routes and/or rendezvous points. For instance, the delivery plan may be generated based on known or calculated distance to be traversed on an agent's delivery route (e.g., distances between delivery address) and/or the physical layout of the region and delivery locations. For instance, the delivery plan may attribute more time to a delivery route that includes traversal of multiple building floors, such as by stairs or elevator. In various embodiments, rendezvous points for two or more agents may be shared. This configuration may provide a level of redundancy to the delivery scheme. For instance, if one agent is sick, running late, or otherwise unavailable, another agent schedule to arrive at the same rendezvous point may accept and deliver that absent agent's shipments.

In various embodiments, each group of multiple groups of shipments in the delivery vehicle may correspond to a different segment of an agent delivery route (e.g., a segment between rendezvous points). These groups of items may be physically ordered within a specific sequence within the delivery vehicle to facilitate easy egress from the delivery vehicle. In various embodiments, this sequence may be specified by the delivery plan described in more detail below. In various embodiments, shipments may also be ordered within the totes used by the delivery agents to facilitate efficient delivery. For instance, shipments may be ordered according to the order in which they are to be delivered. In various embodiments, the order of items within totes may also be specified by the delivery plan described in more detail below.

In various embodiments, the historical data described herein may be captured overtime through mobile and/or handheld devices utilized by delivery agents. For instance, agents may optically scan shipments (or by extension the totes of the shipment) at rendezvous time and again scan the shipment at the point of delivery. In this way the delivery time may be calculated or inferred and recorded for later use (e.g., for generating delivery plans as described in more detail below).

In various embodiments, agents may use public transportation to and/or from their initial and final rendezvous locations. For instance, embodiments may include sending a text message to a delivery agent the day before that agent's work shift. The message may specify a time and/or location (e.g., an initial rendezvous) at which to initially meet the delivery vehicle. The delivery agent may then utilize public transportation to report to the specified rendezvous point. In various embodiments, the delivery plan generator described herein may utilize public transit schedules in order to structure the agent routes described herein. For instance, the delivery plan generator may create convenient start times for agents based on public transit schedules. In another example, agents may use public transit while on delivery routes and/or in between delivery routes, and the delivery plan generator may utilize the public transit information to schedule the agents delivery route(s) around convenient public transit times. In other cases, agents may be picked up by the delivery vehicle; the agents may in various embodiments perform the sorting of shipment groups according to the delivery plan in order to facilitate efficient egress of shipment groups from the delivery vehicle.

In various embodiments, the historical data utilized to generate the delivery plan may be analyzed for trends that may be utilized when generating an efficient delivery plan (e.g., scheduled rendezvous for the agents and delivery vehicle). For instance, the historical delivery data may indicate that one address is always unoccupied at delivery time thereby representing an inefficiency. For instance, for a shipment requiring a signature, an unoccupied delivery location may require a delivery agent to return the respective shipment to the delivery vehicle and/or retry delivery at a later time. In contrast, another address might always be occupied. This type of address may yield efficient deliveries as someone is typically present to receive shipments, such as shipments requiring a signature.

In various embodiments, the multi-tier delivery scheme of FIG. 2 (and variations thereof) may be utilized to eliminate or at least partially mitigate the time in which the vehicle driver lets the delivery vehicle 230 sit idle. For instance, as shipments are dropped off to agents in a batched manner at rendezvous points, the delivery vehicle sits idle for a much shorter time than it would had those shipments been delivered individually by the vehicle driver. Utilizing the delivery scheme, which may be defined by the delivery plans described herein, may prevent excessive idling and vehicle emissions, as well as increase the quantity of shipments that may be processed by a delivery vehicle in a given time period.

Figure 3:
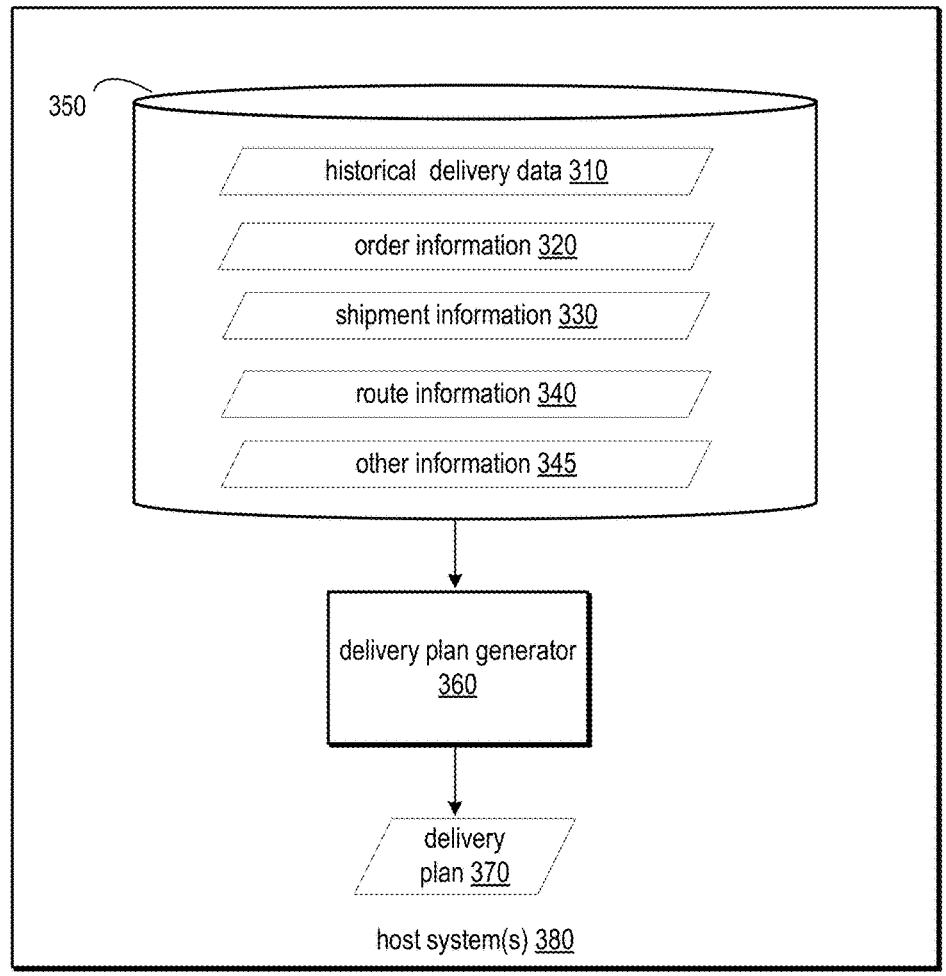
FIG. 3 illustrates a block diagram of an example system configured to implement a delivery plan generator, according to some embodiments.

Various embodiments may include a delivery plan that specifies one or more portions of the coordinated shipment delivery and agent-vehicle rendezvous of FIG. 2. FIG. 3 illustrates a system configured to generate such a delivery plan. In the illustrated embodiment, delivery plan generator 360 may be implemented on one or more host system(s) 380. In various embodiments, one or more of host systems 380 may be configured as computer systems, such as computer 700 of FIG. 7. In various embodiments delivery plan generator 360 may be configured to generate delivery plans according to the method described below with respect to FIG. 5.

In various embodiments, delivery plan generator 360 may be configured to generate a delivery plan based on the information stored in data store 350. This information may include historical delivery data 310, order information 320, shipment information 330, and route information 340. In various embodiments, historical delivery data may include information about previous shipment deliveries. For instance, historical delivery data 310 may include delivery times for previous shipment deliveries. These delivery times may in some cases specify the time needed to convey an item from a rendezvous point to a delivery destination. In some cases, this information may specify historical delivery times for other starting points. For instance, historical delivery times between a first address and second address may be included. This type of information may be helpful for determining estimated delivery times for shipments headed to proximate delivery locations (e.g., apartments on a common floor). As described above, the historical data described herein may be captured overtime through mobile and/or handheld devices utilized by delivery agents. For instance, agents may optically scan shipments (or by extension the totes of the shipment) at rendezvous time and again scan the shipment at the point of delivery. In this way the delivery time may be calculated or inferred and recorded for later use (e.g., for generating delivery plans as described in more detail below). Furthermore, the historical data utilized to generate the delivery plan may be analyzed for trends that may be utilized when generating an efficient delivery plan (e.g., scheduled rendezvous for the agents and delivery vehicle). For instance, the historical delivery data may indicate that one address is always unoccupied at delivery time thereby representing an inefficiency. For instance, for a shipment requiring a signature, an unoccupied delivery location may require a delivery agent to return the respective shipment to the delivery vehicle and/or retry delivery at a later time. In contrast, another address might always be occupied. This type of address may yield efficient deliveries as a result of a customer being present to receive shipments (e.g., shipments requiring a signature).

In various embodiments, data store 350 may store additional information that may be used to by the delivery plan generator to create a delivery plan. This additional information is illustrated as other information 345. In various embodiments, other information 345 may include personnel schedules, such as start times and stop times for agent shifts. The delivery plan generator may take this information into account when generating a delivery plan. For instance, the delivery plan generator may utilize personnel information when assigning different agents to different agent routes. In various embodiments, other information 345 may also include agent profiles. For instance, some agents may perform at a higher rate of work (e.g., deliveries per hour) than other agents. The delivery plan generator may take this profile information into account when generating the delivery plan. In various embodiments, other information 345 may also include one or more address profiles for delivery destinations. For instance, address profiles may include special instructions for certain delivery destinations, such as "deliver to back door" or "knock three times." The delivery plan generator may incorporate this information into the delivery plan. For instance, special instructions may be presented to delivery agents on handheld devices (e.g., agent devices 430 described below). In various embodiments, other information 345 may also include geographical information, such as elevation and grades. This information may be used by the delivery plan generator to, e.g., adjust estimated transit times depending on the difficulty of a route. In various embodiments, the other information 345 may also include historical, real-time, and/or projected traffic or weather information. For instance, if a particular route has or is expected to have heavy traffic or inclement weather, the delivery plan generator may account for this when generating the delivery plan, such as by allotting more time for a particular route or selecting an alternate route. In various embodiments, other information 345 may include parking information, such as information that identifies optimal parking spots, specifies parking hours for parking spots, availability information for parking spots (e.g., parking spot A is available 75% of the time) and/or information specifying the location of one or more parking spots. The delivery plan generator may incorporate any of this parking information into the delivery plan in various embodiments. In various embodiments, other information 345 may also include information specifying public transit schedules. As described above, agents may use public transit to arrive at work or as intra-route transportation. As such, the delivery plan generator may utilize this information to schedule different routes of the delivery plan.

In various embodiments, the delivery plan generator may generate a delivery plan that specifies different groups of shipments for each leg or segment of an agent's delivery route. In one non-limiting example, each agent may acquire a group of shipments that have been specifically selected by the delivery plan generator to occupy the agent's time until a next rendezvous with the delivery vehicle (or possible a different delivery vehicle) at a different location. To perform this selection process the delivery plan generator may use historical delivery times from historical delivery data 310 in order to group shipments in a way that the delivery agent may reasonably deliver the acquired group of shipments to their respective delivery destinations and also meet the delivery vehicle at the next rendezvous location. For example, the delivery plan generator may determine the aggregate of the historical delivery times associated with destination addresses of shipments and match those to an estimated traversal time for a respective leg of the delivery route (e.g., the leg between rendezvous points). In this way, each delivery agent may deliver their group of shipments and then meet the delivery vehicle at the next rendezvous location. The ability of the delivery plan generator to generate delivery plans in this manner may reduce the quantity of time that delivery vehicles sit idle (e.g., because the delivery vehicle can quickly drop off a batch of shipment to a delivery agent and then move on to the next delivery agent). In this way, the utilization of each delivery vehicle may be greater than it would be absent these techniques.

In various embodiments, order information 320 may include details about an order. For instance, this information may include details associated with the customer, such as payment information. In some cases, the order information may also include details about items in the order, such as physical characteristics (e.g., size, weight, fragility). Shipping information may in various embodiments include actual or expected characteristics of a packed shipment, as well as any shipping restrictions (e.g., a hazardous material status, etc.). In various embodiments, any of this information may be utilized by the delivery plan generator to ensure that tote or container overflow does not occur. For instance, in some embodiments, totes (and/or agents) may have maximum thresholds for aggregate volume capacity and/or weight of shipments that may be conveyed on a delivery route. In some cases, the delivery plan generator may enforce a maximum aggregate value for shipments that may be handled on an agent delivery route. For instance, it may be too risky to permit agents to handle more than $5,000 worth of goods at any given time. In some embodiments, these types of restrictions (e.g., size, weight, value, etc.) may also be applied to the aggregate shipments carried by a delivery vehicle. For instance, in one non-limiting example, the techniques described herein may prevent any given vehicle from transporting more than $30,000 worth of merchandise. In other example, vehicles may have size and/or weight limitations.

In various embodiments, route information may include physical characteristics about routes within various regions. For instance, as described above, factors other than historical delivery times may also be taken into consideration in generation of the delivery plan that specifies the routes and/or rendezvous points. For instance, the delivery plan may be generated based on route information including known or calculated distances to be traversed on an agent's delivery route (e.g., distances between delivery address) and/or the physical layout of the region and delivery locations. For instance, within the delivery plan the delivery plan generator 360 may attribute more time to a delivery route that includes traversal of multiple building floors.

Delivery plan 370 may include any information for coordinating a delivery scheme in which separate delivery agents (e.g., not the driver of the delivery vehicle) perform last segment (e.g., "last mile) delivery. One example of this delivery scheme is described above in FIG. 2. Various modifications of this scheme are possible and contemplated. For instance, in some embodiments, delivery agents may acquire shipments from multiple different vehicles (e.g., trucks) instead of a single vehicle. In other cases, the same delivery vehicle may return to the previous shipping carrier hub to get more shipments (e.g., while the delivery agents are busy delivery shipments on their respective routes). That delivery vehicle may then return to the region (e.g., region 210) to provide delivery agents with more additional shipments. In various embodiments, delivery plan 370 may specify actual times (e.g., 3:00 P.M.) and/or time ranges (e.g., 3:00 P.M-3:05 P.M.) at which the delivery agents and delivery vehicle are to meet at predetermined locations (e.g., rendezvous of FIG. 2). In various embodiments, these times and/or time ranges may be updated or narrowed based on real time tracking of agents. In some cases, the delivery plan may be updated to identify free time during an agent's day and suggest or require a break during that time period. In some embodiments, delivery plan 370 may additionally include map information that indicates the actual routes that are to be traversed by the delivery agents, as well as the routes to be traversed by the delivery vehicles.

Figure 4:
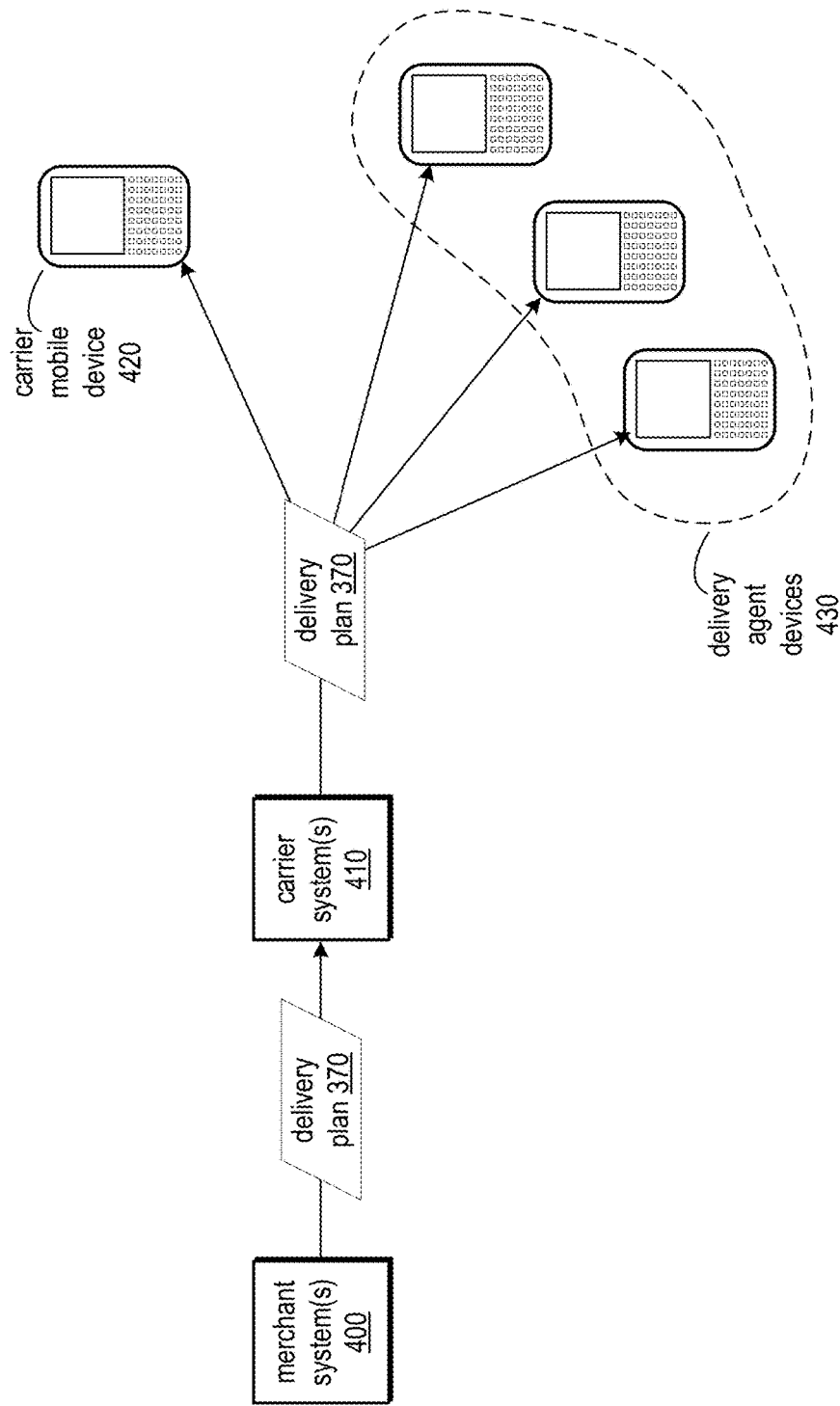
FIG. 4 illustrates a block diagram of an example system configuration for distributing delivery plans, according to some embodiments.

In various embodiments, delivery plan 370 may be conveyed to the delivery agents as well as the delivery vehicle driver such that all parties are made aware of the relevant rendezvous points for coordinated delivery, such as that described with respect to FIG. 2. FIG. 4 illustrates the distribution of delivery plan 370 according to various embodiments. In the illustrated embodiment, one or more merchant systems (e.g., merchant computers) may send delivery plan 370 to one or more systems owned or controlled by the relevant shipment carrier, as illustrated by carrier systems 410. Carrier systems may provide the delivery plan to mobile devices associated with the carrier, such as carrier mobile device 420, as well as mobile devices associated with delivery agents, such as delivery agent devices 430. In other embodiments, merchant systems 400 may provide delivery plan 370 directly to agent mobile devices 430 without using the carrier systems as an intermediary. In various embodiments, carrier mobile device 420 may be a mobile device accessible to the driver of delivery vehicle 230 described above. Similarly, delivery agent devices 430 may be mobile devices accessible to delivery agents 240. In this way, all parties may be apprised of one or more portions of the delivery plan in order to carrier out the multi-tier delivery scheme of FIG. 2 described above. In various embodiments, any of the mobile devices of FIG. 4 may be implemented by a computer, such as that of FIG. 7 described below. Furthermore, in various embodiments, the communication of delivery plan 370 may occur over one or more networks, such as network 785 described with respect to FIG. 7.

Figure 5:
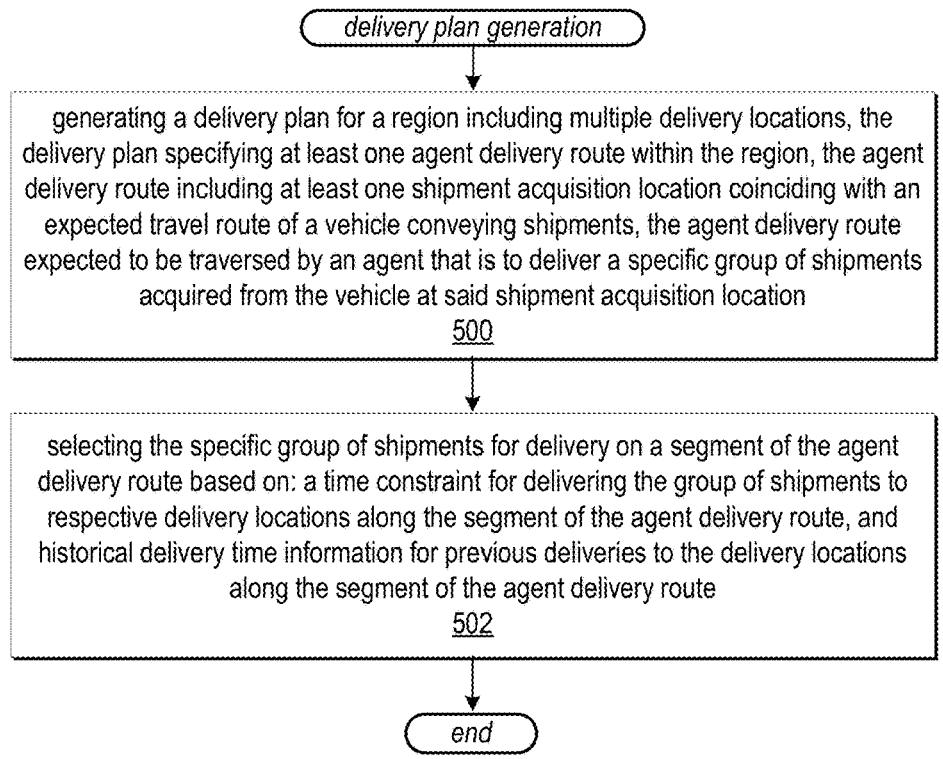
FIG. 5 illustrates a flowchart of an example method for generating a delivery plan, according to some embodiments.

The system and method for generating a delivery plan for multi-tier delivery schemes may include various methods, some of which are described in more detail below with respect to FIGS. 5 and 6. In various embodiments, the illustrated methods may be performed by a computer, such as the computer system of FIG. 7 described below. FIG. 5 illustrates an example method for generating a delivery plan according to various embodiments. As illustrated at block 500, the method may include generating a delivery plan for a region including multiple delivery locations. The delivery plan may specify one or more agent delivery routes within the region. The agent delivery route may include at least one shipment acquisition location coinciding with an expected travel route of a vehicle conveying shipments, such as the rendezvous locations described above. In various embodiments, the agent delivery route is to be traversed by an agent that is to deliver a specific group of shipments acquired from the vehicle at said shipment acquisition location. One example of this type of delivery plan is described above with respect to delivery plan 370. For instance, the delivery plan may specify the rendezvous points and other information to coordinate delivery of shipments similar to the techniques of FIG. 2 described above.

As illustrated at block 502, the method may also include selecting the specific group of shipments for delivery on a segment of the agent delivery route based on: a time constraint for delivering the group of shipments to respective delivery locations along the segment of the agent delivery route, and historical delivery time information for previous deliveries to the delivery locations along the segment of the agent delivery route. One example of such a time constraint may include an estimate of the time between rendezvous points for the delivery vehicle. In other words, the method may avoid selecting shipments having historical delivery times that, when considered in the aggregate, are likely to exceed the estimated time needed by the delivery vehicle for traversing between rendezvous points. By selecting groups of shipments that do not exceed such time, the method may prevent instances in which the delivery vehicle is waiting on agents to arrive at the rendezvous points. In various embodiments, the method may also include selecting a group of shipments having an aggregate historical delivery time that is large enough to occupy an agent on a given segment of his delivery route. In this way the method may avoid situations in which the agent is idle waiting for the delivery vehicle to arrive at a rendezvous point. In general, this portion of the method may seek to match the aggregate (e.g., sum) delivery time for the shipments in the selected group to the time that it takes the historical time that it takes the vehicle to traverse between to rendezvous points. In one non-limiting example, the aggregate of the historical delivery times associated with destination addresses of shipments may be matched to an estimated traversal time for a respective leg of the delivery route (e.g., the leg between rendezvous points). In this way, each delivery agent may deliver their group of shipments and then meet the delivery vehicle at the next rendezvous location. As described above, this process may reduce the quantity of time that delivery vehicles sit idle because the delivery vehicle can quickly drop off a batch of shipment to a delivery agent and then move on to the next delivery agent. In this way, the utilization of each delivery vehicle is greater than it would be absent these techniques of the method.

In various embodiments, in addition to time considerations, the method may also include selecting a specific group of shipments for an agent delivery route (or a specific segment of an agent delivery route) based on thresholds for aggregate size (e.g., volume), weight and/or value. For instance, in some cases, the method may include ensuring that a group of shipments does not exceed the size and/or weight capacity of a tote or container used to convey the shipments. In some cases, the method may include enforcing a maximum aggregate value for shipments that may be handled on an agent delivery route. For instance, it may be too risky to permit agents to handle more than $5,000 worth of goods at any given time.

In various embodiments of the method, factors other than historical delivery times may also be taken into consideration in generation of the delivery plan that specifies the routes and/or rendezvous points. For instance, the method may include generating the delivery plan based on known or calculated distance to be traversed on an agent's delivery route (e.g., distances between delivery address) and/or the physical layout of the region and delivery locations. For instance, embodiments of the method may attribute more time to a delivery route that includes traversal of multiple building floors, such as by stairs or elevator.

In various embodiments of the method, the method may include analyzing the historical data utilized to generate the delivery plan for trends that may be utilized when generating an efficient delivery plan (e.g., efficient scheduled rendezvous for the agents and delivery vehicle). For instance, the historical delivery data may indicate that one address is always unoccupied at delivery time thereby representing an inefficiency. For example, for a shipment requiring a signature, an unoccupied delivery location may require a delivery agent to return the respective shipment to the delivery vehicle and/or retry delivery at a later time. In contrast, another address might always be occupied. As described above, this type of address may yield efficient deliveries as someone is typically present to receive shipments, such as shipments requiring a signature.

In various embodiments, the method may include selecting the specific group of shipments based on delivery destinations for shipments of that group having shorter historical delivery times than delivery destinations of other shipments sent by the merchant. For example, in some embodiments of the method, the group of shipments selected for a given segment of an agent delivery route may include shipments that historically do not take long to delivery relative to other shipments. In this way, embodiments may ensure that an agent's throughput is maximized or nearly maximized. For instance, in the example described above in which deliveries are slowed at a specific address due to the customer frequently being away, the method may avoid assigning shipments for this type of address to the agents. In various embodiments, the historical delivery times utilized in these aspects of the method may include historical averages and/or distributions. In various embodiments, the method may include mixing and matching delivery destinations that have different standard deviations in order to minimize the risk that an agent will not be able to deliver all the shipments of a route segment on time. For instance, when selecting a group of shipments for a particular route segment, the method may include intentionally limiting the quantity of shipments destined for delivery addresses with large standard deviations of for their respective delivery time distributions. By not aggregating too many shipments with large standard deviations for delivery times together, the method may mitigate the risk that an agent will not be able to deliver all the shipments of a route segment on time. In various embodiments, the method may employ other risk mitigation techniques, such as placing flexible shipments at the end of a daily delivery route. For instance, a flexible shipment may include a shipment that may be delivered the next day without penalty, such as a shipment that was not promised to the customer until the next day.

In various embodiments, the method may include updating the delivery plan in response to one or more events. These events may include but are not limited to personnel issues (e.g., sick or absent personnel), traffic events (e.g., a traffic jam or accident), and/or weather events (e.g., inclement weather). In various embodiments, whenever an event is detected, the method may include updating the delivery plan in response to those events. In other cases, notifications of events may be batched and the delivery plan may be generated periodically (or aperiodically) in response to batches of events.

Figure 6:
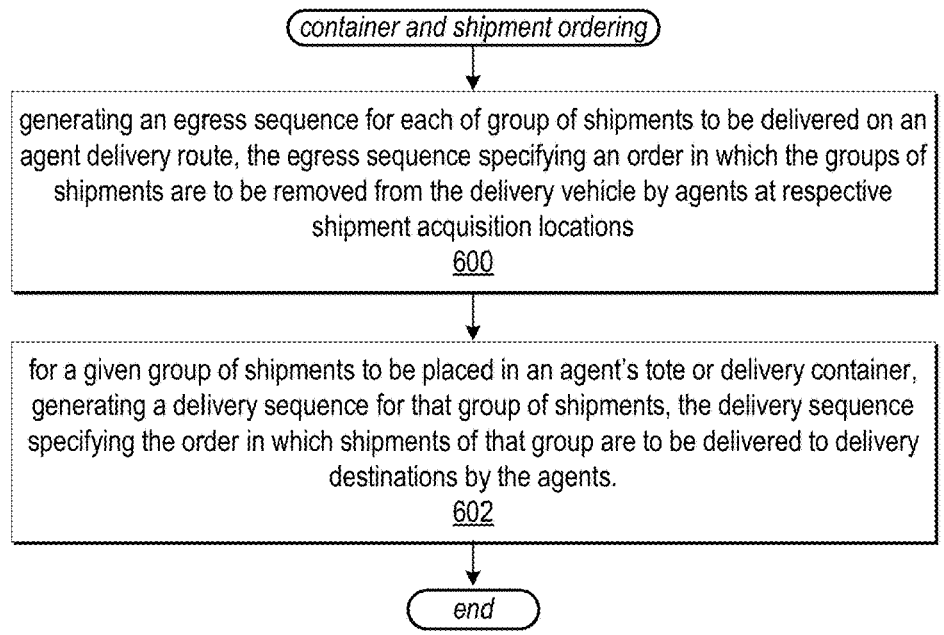
FIG. 6 illustrates a flowchart of an example method for generating a shipment sequences, according to some embodiments.

FIG. 6 illustrates an example method for ordering shipments for efficient egress from a delivery vehicle as well as ordering items for efficient egress form totes or containers. As illustrated at block 600, the method may include generating an egress sequence for each of group of shipments to be delivered on an agent delivery route. The egress sequence may specify an order in which the groups of shipments are to be removed from the delivery vehicle by agents at respective shipment acquisition locations. For instance, in various embodiments, each group of multiple groups of shipments in the delivery vehicle may correspond to a different segment of an agent delivery route (e.g., a segment between rendezvous points). These groups of items may be physically ordered within a specific sequence within the delivery vehicle to facilitate easy egress from the delivery vehicle. In various embodiments, the method may include determining this order as an egress sequence in order to realize the efficiencies of organizing shipment groups within the delivery vehicle in this manner. In various embodiments, the egress sequence described herein may be generated as part of the delivery plan generated according to the techniques of FIG. 5.

As illustrated at block 602, the method may also include, for a given group of shipments to be placed in an agent's tote or delivery container, generating a delivery sequence for that group of shipments. This delivery sequence may specify the order in which shipments of that group are to be delivered to delivery destinations by the agents. For instance, in various embodiments, shipments may be ordered within the totes used by the delivery agents to facilitate efficient delivery. For example, shipments may be ordered according to the order in which they are to be delivered. In various embodiments, the order of items within totes may also be generated as part of the delivery plan generated according to the techniques of FIG. 5.

Example Computer System

Various embodiments of the system and method for generating a delivery plan for multi-tier delivery schemes, as described herein, may be executed on one or more computer systems, which may interact with various other devices. Note that any component, action, or functionality described above with respect to FIGS. 1-7 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions 722 may be configured to implement any functionality described above including but not limited to that of delivery plan generator 360 described above. Additionally, data 732 of memory 720 may store any of the information or data structures described above, including but not limited to probabilistic historical delivery data 310, order information 320, shipment information 330, route information 340 and/or delivery plan 370. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 (e.g., carrier or agent devices) or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 7:
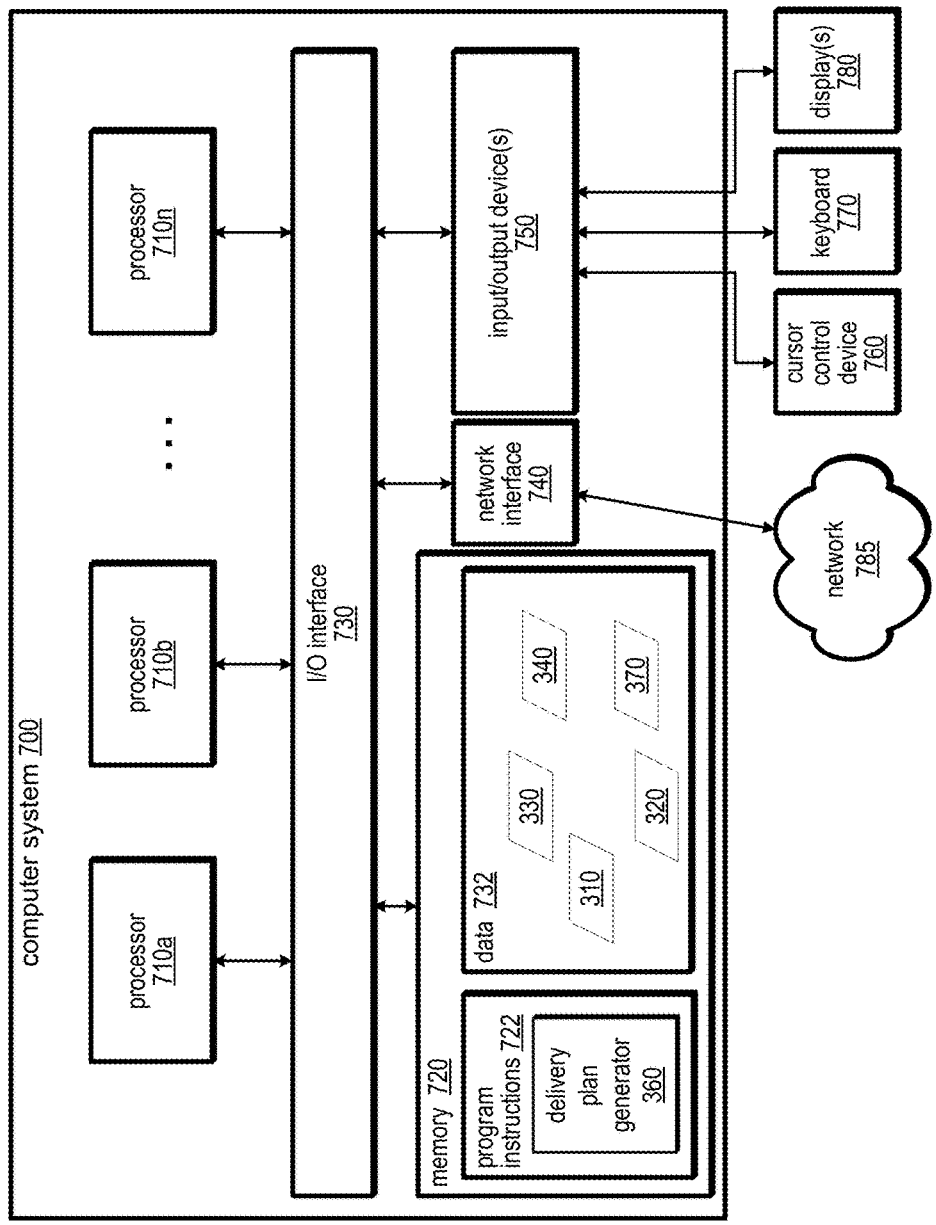
FIG. 7 illustrates one example of a computer system suitable for implementing various elements of the system and method for generating a delivery plan for multi-tier delivery schemes, according to some embodiments.

As shown in FIG. 7, memory 720 may include program instructions 722, which may be processor-executable to implement any element or action described above. In one embodiment, the program instructions may implement the methods described above, such as the methods illustrated by FIGS. 5-6. In other embodiments, different elements and data may be included. Note that data 732 may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
generating a final segment delivery plan for a region including multiple delivery locations, wherein the final segment delivery plan comprises:
an expected vehicle travel route of a vehicle conveying shipments within the region; and
at least one agent delivery route within the region, wherein the agent delivery route includes at least one shipment acquisition location coinciding with the expected vehicle travel route, wherein said agent delivery route is distinct from the expected travel route of the vehicle, and is a final segment of a larger delivery route, and wherein said agent delivery route is to be traversed by a robotic agent that is to deliver a specific group of shipments acquired from the vehicle at said shipment acquisition location, wherein the robotic agent's traversal of the agent delivery route is specified to be performed during at least a portion of the vehicle's traversal of the expected vehicle travel route;
selecting the specific group of shipments for delivery on a segment of said agent delivery route, wherein said selecting is based on:
a time constraint for delivering the group of shipments to respective delivery locations along said segment of the agent delivery route, and
historical delivery time information for previous deliveries to the delivery locations along said segment of the agent delivery route;
transmitting one or more instructions associated with the generated final segment delivery plan to the robotic agent via network communication over one or more networks, wherein the one or more instructions direct the robotic agent to traverse the at least a portion of the specified agent delivery route while the vehicle traverses at least a portion of the specified expected vehicle travel route;
calculate, based on a robotic agent rendezvous time at the vehicle and one or more delivery times at one or more points of delivery along the agent delivery route obtained from the robotic agent, delivery time information associated with the agent delivery route;
for a next delivery plan:
select a subsequent group of shipments for delivery on said segment of said agent delivery route based on:
a time constraint for delivering the subsequent group of shipment to respective delivery locations along said segment of the said agent delivery route, and the calculated delivery time information associated with said agent delivery route; and
transmit instructions, via a network communication over one or more networks to the robotic agent, that direct the robotic agent to traverse said agent delivery route to deliver the subsequently-selected group of shipments while the vehicle traverses at least a portion of the specified expected vehicle travel route.

2. The computer-implemented method of claim 1, wherein said time constraint is a constraint based on an expected time of a subsequent acquisition of additional items, wherein said subsequent acquisition includes the agent acquiring another group of shipments from a delivery vehicle at another shipment acquisition location on said agent delivery route.

3. The computer-implemented method of claim 1, wherein said specific group of shipments originate from a merchant, wherein the method comprises selecting said specific group of shipments based on delivery destinations for shipments of that group having shorter historical delivery times than delivery destinations of other shipments sent by the merchant.

4. The computer-implemented method of claim 3, wherein the method comprises selecting said specific group of shipments based on the historical delivery times in order to maximize the quantity of shipments to be delivered on the agent delivery route.

5. A computer-implemented method, comprising:
generating a delivery plan for a region including multiple delivery locations, wherein the delivery plan comprises:
an expected vehicle travel route of a vehicle conveying shipments within the region; and
at least one agent delivery route within the region, wherein the agent delivery route includes at least one shipment acquisition location coinciding with the expected vehicle travel route, wherein said agent delivery route is distinct from the expected travel route of the vehicle, and wherein said agent delivery route is to be traversed by a robotic agent that is to deliver a specific group of shipments acquired from the vehicle at said shipment acquisition location;
wherein generating the delivery plan includes generating a delivery plan that specifies that the robotic agent is to traverse at least a portion of the specified agent delivery route while the vehicle traverses at least a portion of the specified expected vehicle travel route;
selecting the specific group of shipments for delivery on a segment of said agent delivery route, wherein said selecting is based on:
a time constraint for delivering the group of shipments to respective delivery locations along said segment of the agent delivery route, and
historical delivery time information for previous deliveries to the multiple delivery locations along said segment of the agent delivery route; and
transmitting one or more instructions associated with the generated delivery plan to the robotic agent via network communication over one or more networks, wherein the one or more instructions direct the robotic agent to traverse the at least a portion of the specified agent delivery route while the vehicle traverses at least a portion of the specified expected vehicle travel route;
calculating, based on a robotic agent rendezvous time at the vehicle and one or more delivery times at points of delivery along the agent delivery route obtained from the robotic agent, delivery time information associated with the agent delivery route;
for a next delivery plan:

selecting a subsequent group of shipments for delivery on the segment of said agent delivery route based on:
  a time constraint for delivering the subsequent group of shipments to respective delivery locations along said segment of the agent delivery route, and
  the calculated delivery time information associated with the agent delivery route; and
transmitting instructions, via network communication over one or more networks to the robotic agent, that direct the robotic agent to traverse the agent delivery route to deliver the subsequently-selected group of shipments while the vehicle traverses at least a portion of the specified expected vehicle travel route.

6. The computer-implemented method of claim 5, wherein said time constraint is a constraint based on an expected time of a subsequent acquisition of additional items, wherein said subsequent acquisition includes the agent acquiring another group of shipments from a delivery vehicle at another shipment acquisition location on said agent delivery route.

7. The computer-implemented method of claim 5, wherein said specific group of shipments originate from a merchant, wherein the method comprises selecting said specific group of shipments based on delivery destinations for shipments of that group having shorter historical delivery times than delivery destinations of other shipments sent by the merchant.

8. The computer-implemented method of claim 7, wherein the method comprises selecting said specific group of shipments based on the historical delivery times in order to maximize the quantity of shipments to be delivered on the agent delivery route.

9. The computer-implemented method of claim 5, wherein said vehicle comprises multiple different groups of shipments to be delivered by agents on respective agent delivery routes; wherein the method comprises generating an egress sequence for each of those groups of shipments, the egress sequence specifying an order in which the groups of shipments are to be removed from the delivery vehicle by agents at respective shipment acquisition locations.

10. The computer-implemented method of claim 9, wherein the method comprises, for each given group of shipments, generating a delivery sequence for that group of shipments, wherein said delivery sequence specifies the order in which shipments of that group are to be delivered to delivery destinations by the agents.

11. The computer-implemented method of claim 10, wherein the method comprises conveying the delivery sequence of each given order to a mobile device possessed by the respective agent.

12. The computer-implemented method of claim 5, wherein the method comprises selecting said specific group of shipments based on one or more of: travel distances of the agent delivery route or physical configurations of delivery locations on the agent delivery route.

13. The computer-implemented method of claim 5, wherein said vehicle is tasked with delivering other shipments distinct from the specific group of shipments.

14. The computer-implemented method of claim 5, wherein the method comprises regenerating the delivery plan in response to detecting an event.

15. The computer-implemented method of claim 14, wherein said event comprises one or more of: a personnel status change, a weather event, or a traffic event.

16. The computer-implemented method of claim 5, wherein the selection of the specific group of shipments is additionally based on a restriction on one or more of: an aggregate size for the specific group of shipments, an aggregate weight for the specific group of shipments, or an aggregate value for the specific group of shipments.

17. A system, comprising:
a memory; and
one or more processors coupled to the memory, wherein the memory comprises program instructions executable by the one or more processors to:
  generate a delivery plan for a region including multiple delivery locations, wherein the delivery plan comprises:
    an expected vehicle travel route of a vehicle conveying shipments within the region; and
    at least one agent delivery route within the region, wherein the agent delivery route includes at least one shipment acquisition location coinciding with the expected vehicle travel route, wherein said agent delivery route is distinct from the expected travel route of the vehicle, and wherein said agent delivery route is to be traversed by a robotic agent that is to deliver a specific group of shipments acquired from the vehicle at said shipment acquisition location;
  wherein to generate the delivery plan for the region, the program instructions are executable to generate a delivery plan that specifies that the robotic agent is to traverse at least a portion of the specified agent delivery route while the vehicle traverses at least a portion of the specified expected vehicle travel route;
  wherein to select the specific group of shipments for delivery on a segment of said agent delivery route, the program instructions are executable to select that group based on:
    a time constraint for delivering the group of shipments to respective delivery locations along said segment of the agent delivery route, and
    historical delivery time information for previous deliveries to the delivery locations along said segment of the agent delivery route;
  transmit one or more instructions associated with the generated delivery plan to the robotic agent via network communication over one or more networks, wherein the one or more instructions direct the robotic agent to traverse the at least a portion of the specified agent delivery route while the vehicle traverses at least a portion of the specified expected vehicle travel route;
  calculate, based on a robotic agent rendezvous time at the vehicle and one or more delivery times at points of delivery along the agent delivery route obtained from the robotic agent, delivery time information associated with the agent delivery route;
  for a next delivery plan:
    select a subsequent group of shipments for delivery on the segment of said agent delivery route based on:
      a time constraint for delivering the subsequent group of shipments to respective delivery locations along said segment of the agent delivery route, and
      the calculated delivery time information associated with the agent delivery route; and
    transmit one or more instructions, via network communication over one or more networks to the robotic agent, that direct the robotic agent to traverse the agent delivery route to deliver the subsequently-selected group of shipments while the vehicle traverses at least a portion of the specified expected vehicle travel route.

18. The system of claim 17, wherein said time constraint is a constraint based on an expected time of a subsequent acquisition of additional items, wherein said subsequent acquisition includes the agent acquiring another group of shipments from a delivery vehicle at another shipment acquisition location on said agent delivery route.

19. The system of claim 17, wherein said specific group of shipments originate from a merchant, wherein the program instructions are configured to select said specific group of shipments based on delivery destinations for shipments of that group having shorter historical delivery times than delivery destinations of other shipments sent by the merchant.

20. The system of claim 19, wherein the program instructions are configured to select said specific group of shipments based on the historical delivery times in order to maximize the quantity of shipments to be delivered on the agent delivery route.

21. The system of claim 17, wherein said vehicle comprises multiple different groups of shipments to be delivered by agents on respective agent delivery routes; wherein the program instructions are configured to generate an egress sequence for each of those groups of shipments, the egress sequence specifying an order in which the groups of shipments are to be removed from the delivery vehicle by agents at respective shipment acquisition locations.

22. The system of claim 21, wherein the program instructions are configured to, for each given group of shipments, generate a delivery sequence for that group of shipments, wherein said delivery sequence specifies the order in which shipments of that group are to be delivered to delivery destinations by the agents.

23. The system of claim 22, wherein the program instructions are configured to convey the delivery sequence of each given order to a mobile device possessed by the respective agent.

24. The system of claim 17, wherein the program instructions are configured to select said specific group of shipments based on one or more of: travel distances of the agent delivery route or physical configurations of delivery locations on the agent delivery route.

25. The system of claim 17, wherein said vehicle is tasked with delivering other shipments distinct from the specific group of shipments.

26. A non-transitory computer-readable storage medium, storing program instructions computer-executable on a computer to:
generate a delivery plan for a region including multiple delivery locations, wherein the delivery plan comprises:
an expected vehicle travel route of a vehicle conveying shipments within the region; and
at least one agent delivery route within the region, wherein the agent delivery route includes at least one shipment acquisition location coinciding with the expected vehicle travel route, wherein said agent delivery route is distinct from the expected travel route of the vehicle, and wherein said agent delivery route is to be traversed by a robotic agent that is to deliver a specific group of shipments acquired from the vehicle at said shipment acquisition location;
wherein to generate the delivery plan the instructions are executable to generate a delivery plan that specifies that the robotic agent is to traverse at least a portion of the specified agent delivery route while the vehicle traverses at least a portion of the specified expected vehicle travel route;
wherein to select the specific group of shipments for delivery on a segment of said agent delivery route, the program instructions are executable to select that group based on:
a time constraint for delivering the group of shipments to respective delivery locations along said segment of the agent delivery route, and
historical delivery time information for previous deliveries to the delivery locations along said segment of the agent delivery route;
transmit one or more instructions associated with the generated delivery plan to the robotic agent via network communication over one or more networks, wherein the one or more instructions direct the robotic agent to traverse the at least a portion of the specified agent delivery route while the vehicle traverses at least a portion of the specified expected vehicle travel route;
calculate, based on a robotic agent rendezvous time at the vehicle and one or more delivery times at points of delivery along the agent delivery route obtained from the robotic agent, delivery time information associated with the agent delivery route;
for a next delivery plan:
select a subsequent group of shipments for delivery on the segment of said agent delivery route based on:
a time constraint for delivering the subsequent group of shipments to respective delivery locations along said segment of the agent delivery route, and
the calculated delivery time information associated with the agent delivery route; and
transmit one or more instructions, via network communication over one or more networks to the robotic agent, that direct the robotic agent to traverse the agent delivery route to deliver the subsequently-selected group of shipments while the vehicle traverses at least a portion of the specified expected vehicle travel route.

27. The non-transitory computer-readable storage medium of claim 26, wherein said time constraint is a constraint based on an expected time of a subsequent acquisition of additional items, wherein said subsequent acquisition includes the agent acquiring another group of shipments from a delivery vehicle at another shipment acquisition location on said agent delivery route.

28. The non-transitory computer-readable storage medium of claim 26, wherein said specific group of shipments originate from a merchant, wherein the program instructions are configured to select said specific group of shipments based on delivery destinations for shipments of that group having shorter historical delivery times than delivery destinations of other shipments sent by the merchant.

29. The non-transitory computer-readable storage medium of claim 28, wherein the program instructions are configured to select said specific group of shipments based on the historical delivery times in order to maximize the quantity of shipments to be delivered on the agent delivery route.

30. The non-transitory computer-readable storage medium of claim 26, wherein said vehicle comprises multiple different groups of shipments to be delivered by agents on respective agent delivery routes; wherein the program instructions are configured to generate an egress sequence for each of those groups of shipments, the egress sequence specifying an order in which the groups of shipments are to be removed from the delivery vehicle by agents at respective shipment acquisition locations.

* * * * *